US007571093B1

(12) United States Patent
Cusmariu

(10) Patent No.: US 7,571,093 B1
(45) Date of Patent: Aug. 4, 2009

(54) METHOD OF IDENTIFYING DUPLICATE VOICE RECORDING

(75) Inventor: Adolf Cusmariu, Eldersburg, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 610 days.

(21) Appl. No.: 11/506,090

(22) Filed: Aug. 17, 2006

(51) Int. Cl.
*G10L 11/04* (2006.01)
*G10L 21/00* (2006.01)
*G10L 15/00* (2006.01)
*G06F 17/00* (2006.01)

(52) U.S. Cl. ....................... 704/207; 704/201; 704/239; 704/270; 707/101

(58) Field of Classification Search ....................... None
See application file for complete search history.

(56) References Cited

U.S. PATENT DOCUMENTS 6,067,444 A 5/2000 Cannon et al.
6,766,523 B2 * 7/2004 Herley ......................... 725/19
7,035,867 B2 * 4/2006 Thompson et al. .......... 707/102
7,120,581 B2 * 10/2006 Kahn et al. ................. 704/235
7,421,305 B2 * 9/2008 Burges et al. ................. 700/94
2005/0182629 A1 * 8/2005 Coorman et al. ............ 704/266

* cited by examiner

*Primary Examiner*—Matthew J Sked
(74) *Attorney, Agent, or Firm*—Robert D. Morelli

(57) ABSTRACT

A method of identifying duplicate voice recording by receiving digital voice recordings, selecting one of the recordings; segmenting the selected recording, extracting a pitch value per segment, estimating a total time that voice appears in the recording, removing pitch values that are less than and equal to a user-definable value, identifying unique pitch values, determining the frequency of occurrence of the unique pitch values, normalizing the frequencies of occurrence, determining an average pitch value, determining the distribution percentiles of the frequencies of occurrence, returning to the second step if additional recordings are to be processed, otherwise comparing the total voice time, average pitch value, and distribution percentiles for each recording processed, and declaring the recordings duplicates that compared to within a user-definable threshold for total voice time, average pitch value, and distribution percentiles.

17 Claims, 1 Drawing Sheet

METHOD OF IDENTIFYING DUPLICATE VOICE RECORDING

FIELD OF INVENTION

The present invention relates, in general, to data processing for a specific application and, in particular, to digital audio data processing.

BACKGROUND OF THE INVENTION

Voice storage systems may contain duplicate voice recordings. Duplicate recordings reduce the amount of storage available for storing unique recordings.

Prior art methods of identifying duplicate voice recordings include manually listening to records and translating voice into text and comparing the resulting text. Listening to voice recordings is time consuming, and the performance of speech-to-text conversion is highly dependent on language, dialect, and content.

Identifying duplicate voice records is further complicated by the fact that two recordings of different lengths may be duplicates, and two recordings of the same length may not be duplicates. Therefore, there is a need for a method of identifying duplicate voice records that do not have the shortcomings of the prior art methods. The present invention is just such a method.

U.S. Pat. No. 6,067,444, entitled "METHOD AND APPARATUS FOR DUPLICATE MESSAGE PROCESSING IN A SELECTIVE CALL DEVICE," discloses a device for and method of receiving a first message that includes a message sequence number. A subsequent message is received. If the subsequent message has the same message sequence number, address, vector type, length, data, and character total then the subsequent message is determined to be a duplicate. The present invention does not employ message sequence number, address, vector type, and character total as does U.S. Pat. No. 6,067,444. U.S. Pat. No. 6,067,444 is hereby incorporated by reference into the specification of the present invention.

SUMMARY OF THE INVENTION

It is an object of the present invention to identify duplicate voice recording.

It is another object of the present invention to identify duplicate voice recording without listening to the recording.

It is another object of the present invention to identify duplicate voice recording without converting the voice to text.

The present invention is a method of identifying duplicate voice recording.

The first step of the method is receiving digital voice recordings.

The second step of the method is selecting one of the recordings.

The third step of the method is segmenting the selected recording.

The fourth step of the method is extracting a pitch value per segment.

The fifth step of the method is estimating a total time that voice appears in the recording.

The sixth step of the method is removing pitch values that are less than and equal to a user-definable value.

The seventh step of the method is identifying unique pitch values.

The eighth step of the method is determining the frequency of occurrence of the unique pitch values.

The ninth step of the method is normalizing the frequencies of occurrence.

The tenth step of the method is determining an average pitch value.

The eleventh step of the method is determining the distribution percentiles of the frequencies of occurrence.

The twelfth step of the method is returning to the second step if additional recordings are to be processed. Otherwise, proceeding to the next step.

The thirteenth step of the method is comparing the total voice time, average pitch value, and distribution percentiles for each recording processed.

The fourteenth step of the method is declaring the recordings duplicates that compared to within a user-definable threshold for total voice time, average pitch value, and distribution percentiles.

DETAILED DESCRIPTION

Figure 1:
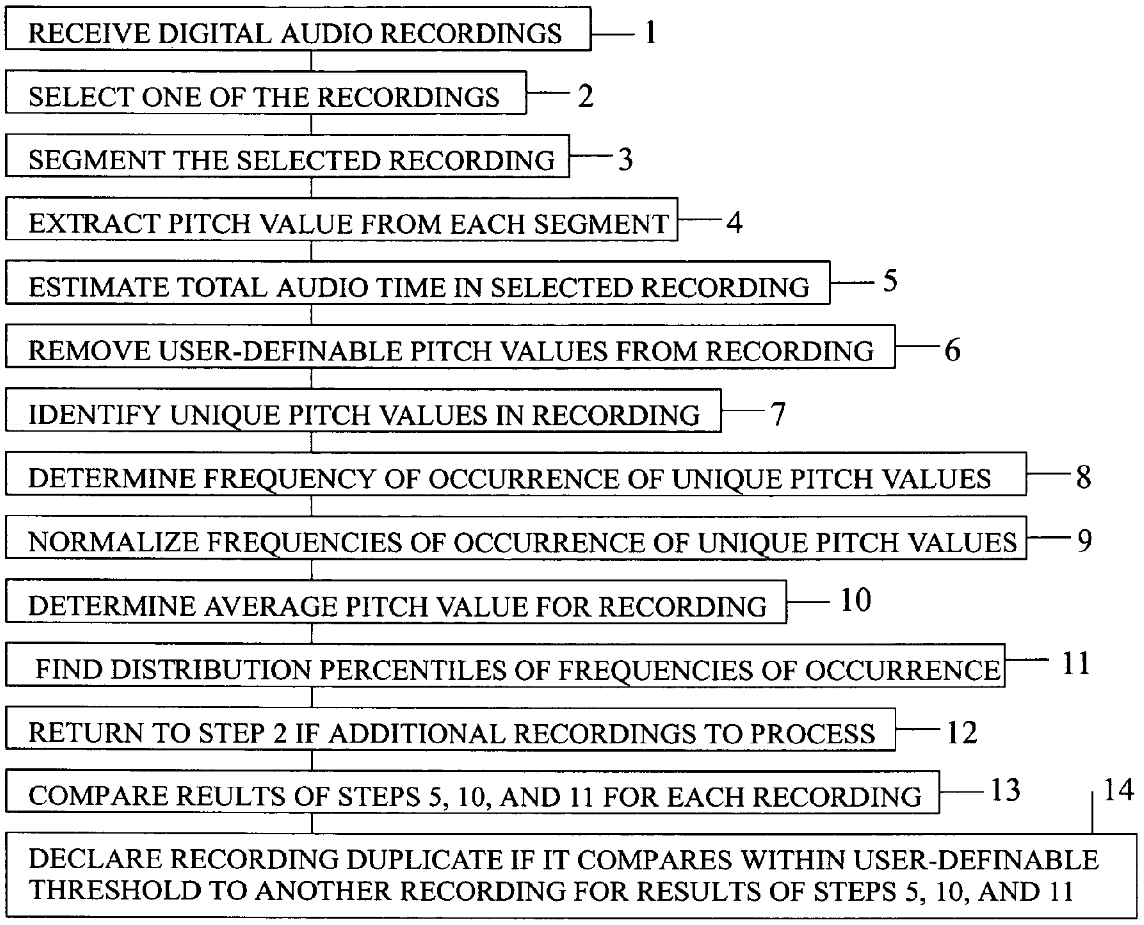
FIG. 1 is a flowchart of the steps of the present invention.

The present invention is a method of identifying duplicate voice recording.

FIG. 1 is a flowchart of the present invention.

The first step 1 of the method is receiving a plurality of digital voice recordings. Digital voice recordings may be received in any digital format.

The second step 2 of the method is selecting one of the digital voice recordings.

The third step 3 of the method is segmenting the selected digital voice recording. In the preferred embodiment, the selected digital voice recording is segmented into 16 millisecond segments sampled at 8000 samples per second.

The fourth step 4 of the method is extracting a pitch value from each segment. The pitch value may be extracted using any pitch extraction method. In the preferred embodiment, a cepstral method is used to extract pitch values.

The fifth step 5 of the method is estimating a total time that voice appears in the selected digital voice recording. In the preferred embodiment, the extracted pitch values are used to estimate the total time that voice appears in the selected digital voice recording.

The sixth step 6 of the method is removing pitch values that are less than and equal to a user-definable value. In the preferred embodiment, the user-definable value is zero. In an alternate embodiment, then method further includes a step of removing pitch values that vary from one pitch value to the next pitch value by less than or equal to a user-definable value.

The seventh step 7 of the method is identifying unique pitch values in the result of the sixth step 6.

The eighth step 8 of the method is determining the frequency of occurrence of the unique pitch values.

The ninth step 9 of the method is normalizing the result of the eighth step 8 so that the frequencies of occurrence are greater than zero and less than one. In the preferred embodiment, the results of the eighth step 8 are normalized by dividing the result of the eighth step 8 step by the number of pitch values remaining after the sixth step 6.

The tenth step 10 of the method is determining an average pitch value from the pitch values remaining after the sixth step 6. In the preferred embodiment, the average pitch value is rounded to the nearest integer.

The eleventh step 11 of the method is determining the distribution percentiles of the result of the eighth step 8.

The twelfth step 12 of the method is returning to the second step 2 if additional digital voice recordings are to be processed. Otherwise, proceeding to the next step.

The thirteenth step 13 of the method is comparing the results of the fifth step 5, the tenth step 10, and eleventh step 11 for each digital voice recording processed.

The fourteenth step 14 of the method is declaring the digital voice recordings duplicates that compared to within a user-definable threshold for each of the results of the fifth step 5, the tenth step 10, and the eleventh step 11.

What is claimed is:

1. A method of identifying duplicate voice recording, comprising the steps of:

a) receiving a plurality of digital voice recordings;

b) selecting one of said plurality of digital voice recordings;

c) segmenting the selected digital voice recording;

d) extracting a pitch value from each segment;

e) estimating a total time that voice appears in the selected digital voice recording;

f) removing pitch values that are less than and equal to a user-definable value;

g) identifying unique pitch values in the result of step (f);

h) determining the frequency of occurrence of the unique pitch values;

i) normalizing the result of step (h) so that the frequencies of occurrence are greater than zero and less than one;

j) determining an average pitch value from the pitch values remaining after step (f);

k) determining the distribution percentiles of the result of step (h);

l) if additional digital voice recordings are to be processed then returning to step (b), otherwise proceeding to the next step;

m) comparing the results of steps (e), (j), and (k) for each digital voice recording processed; and n) declaring the digital voice recordings duplicates that compared to within a user-definable threshold for each of the results of steps (e), (j), and (k).

2. The method of claim 1, wherein the step of receiving a plurality of digital voice recordings is comprised of the step of receiving a plurality of digital voice recordings in any digital format.

3. The method of claim 2, wherein the step of segmenting the selected digital voice recording is comprised of the step of segmenting the selected digital voice recording into 16 millisecond segments sampled at 8000 samples per second.

4. The method of claim 3, wherein the step of extracting a pitch value from each segment is comprised of the step of extracting a pitch value from each segment using any pitch extraction method.

5. The method of claim 4, wherein the step of estimating a total time that voice appears in the selected digital voice recording is comprised of the step of estimating a total time that voice appears in the selected digital voice recording using the pitch values.

6. The method of claim 5, wherein the step of removing pitch values that are less than and equal to a user-definable value is comprised of the step of removing pitch values that are less than and equal to zero.

7. The method of claim 6, further including the step of removing pitch values that vary from one pitch value to the next pitch value by less than or equal to a user-definable value.

8. The method of claim 7, wherein the step of normalizing the result of step (h) so that the frequencies of occurrence are greater than zero and less than one is comprised of the step of dividing the result of step (h) by the number of pitch values remaining after step (f).

9. The method of claim 8, wherein the step of determining an average pitch value from the pitch values remaining after step (f) is comprised of the step of determining an average pitch value from the pitch values remaining after step (f) and rounding to the nearest integer.

10. The method of claim 1, wherein the step of segmenting the selected digital voice recording is comprised of the step of segmenting the selected digital voice recording into 16 millisecond segments sampled at 8000 samples per second.

11. The method of claim 1, wherein the step of extracting a pitch value from each segment is comprised of the step of extracting a pitch value from each segment using any pitch extraction method.

12. The method of claim 1, wherein the step of extracting a pitch value from each segment is comprised of the step of extracting a pitch value from each segment using a cepstral pitch extraction method.

13. The method of claim 1, wherein the step of estimating a total time that voice appears in the selected digital voice recording is comprised of the step of estimating a total time that voice appears in the selected digital voice recording using the pitch values.

14. The method of claim 1, wherein the step of removing pitch values that are less than and equal to a user-definable value is comprised of the step of removing pitch values that are less than and equal to zero.

15. The method of claim 1, further including the step of removing pitch values that vary from one pitch value to the next pitch value by less than or equal to a user-definable value.

16. The method of claim 1, wherein the step of normalizing the result of step (h) so that the frequencies of occurrence are greater than zero and less than one is comprised of the step of dividing the result of step (h) by the number of pitch values remaining after step (f).

17. The method of claim 1, wherein the step of determining an average pitch value from the pitch values remaining after step (f) is comprised of the step of determining an average pitch value from the pitch values remaining after step (f) and rounding to the nearest integer.

* * * * *